United States Patent
Lee et al.

(10) Patent No.: US 8,135,228 B2
(45) Date of Patent: Mar. 13, 2012

(54) APPARATUS AND METHOD FOR IMMERSION GENERATION

(75) Inventors: Ho Young Lee, Suwon-si (KR); Du-Sik Park, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 896 days.

(21) Appl. No.: 12/178,935

(22) Filed: Jul. 24, 2008

(65) Prior Publication Data

US 2009/0185757 A1 Jul. 23, 2009

(30) Foreign Application Priority Data

Jan. 22, 2008 (KR) .................. 10-2008-0006792

(51) Int. Cl.
*G06K 9/40* (2006.01)
*H04N 5/228* (2006.01)
(52) U.S. Cl. .... 382/254; 382/264; 382/266; 348/208.99
(58) Field of Classification Search .................. 382/173, 382/181, 190, 254, 264, 266, 274, 275, 305, 382/312, 263; 348/208.99; 358/3.26, 3.27
See application file for complete search history.

(56) References Cited

U.S. PATENT DOCUMENTS

| | | | |
|---|---|---|---|
| 5,268,967 A | 12/1993 | Jang et al. | |
| 6,043,900 A | 3/2000 | Feng et al. | |
| 6,701,009 B1 | 3/2004 | Makoto et al. | |
| 7,359,552 B2 * | 4/2008 | Porikli | 382/190 |
| 7,599,555 B2 * | 10/2009 | McGuire et al. | 382/173 |
| 7,623,728 B2 * | 11/2009 | Avinash et al. | 382/275 |
| 7,657,171 B2 * | 2/2010 | Sundstrom | 396/133 |
| 7,742,108 B2 * | 6/2010 | Sheraizin et al. | 348/586 |
| 7,756,407 B2 * | 7/2010 | Raskar | 396/55 |
| 7,911,513 B2 * | 3/2011 | Garrison et al. | 348/239 |

FOREIGN PATENT DOCUMENTS

| | | |
|---|---|---|
| JP | 8-307867 | 11/1996 |
| JP | 10-197277 | 7/1998 |
| JP | 11-213156 | 8/1999 |
| JP | 2001-57630 | 2/2001 |
| JP | 2001-99664 | 4/2001 |
| JP | 2002-312782 | 10/2002 |
| JP | 2002-373330 | 12/2002 |
| JP | 2004-150900 | 5/2004 |
| JP | 2004-251694 | 9/2004 |
| JP | 2005-176339 | 6/2005 |
| JP | 2006-92156 | 4/2006 |
| JP | 2007-110360 | 4/2007 |
| KR | 10-2005-0030725 | 3/2005 |
| KR | 2005-30725 | 3/2005 |
| KR | 10-2005-0076474 | 7/2005 |
| KR | 10-2006-0018308 A | 3/2006 |
| KR | 10-0578657 | 5/2006 |

* cited by examiner

*Primary Examiner* — Kanjibhai Patel
(74) *Attorney, Agent, or Firm* — Staas & Halsey LLP

(57) ABSTRACT

An apparatus and method of generating an immersion is provided. The apparatus for generating the immersion includes: a foreground/background separation unit to separate an input image into a foreground area and a background area using lightness information of the input image; an edge classification unit to classify the foreground area into an edge area and a non-edge area using the lightness information; a detail enhancement unit to enhance detail of the edge area of the foreground area; and a blurring performing unit to perform blurring of the non-edge area and the background area.

23 Claims, 9 Drawing Sheets

APPARATUS AND METHOD FOR IMMERSION GENERATION

CROSS-REFERENCE TO RELATED APPLICATION

This application claims the benefit of Korean Patent Application No. 2008-6792, filed on Jan. 22, 2008 in the Korean Intellectual Property Office, the disclosure of which is incorporated herein by reference.

BACKGROUND OF THE INVENTION

1. Field of the Invention

Aspects of the present invention relate to an apparatus and method of generating an immersion, and more particularly, to an apparatus and method of generating an immersion which can generate an immersion by classifying an input image into a foreground area and a background area based on a focusing degree, and enhancing detail or performing blurring.

2. Description of the Related Art

When a viewing angle increases as a total size increases in the case of a display, a person watching an image using the display feels an immersion (or an immersive sensation) via high realism, sufficient relevance, and strong recognition with respect to existence of an object. As the viewing angle increases, the immersion felt by the person can increase.

In the case of the large display, an entire screen of the display can cover a majority of human retinas. Also, in the case of the relatively small display, the entire screen of the display can cover only a main portion of the human retinas.

Vision at a center portion of a human retina is capable of a resolution greater than full high definition. The resolution tends to rapidly decrease moving from the center portion of the retina to a peripheral portion. Accordingly, an area of the retina recognizing a super-resolution image exists only in a small range from the center portion of the retina. However, since a human viewing angle is close to 180°, the person can recognize the expansion of space and feel the immersion. Since the person can be immersed with the image and feel a stereoscopic effect or a spatial sensation using the immersion, the person can experience a realistic image.

Accordingly, a specific method of processing the image to make the person feel the immersion is necessary.

SUMMARY OF THE INVENTION

According to an aspect of the present invention, there is provided an apparatus for generating an immersion, the apparatus including: a foreground/background separation unit to separate an input image into a foreground area and a background area using lightness information of the input image; an edge classification unit to classify the foreground area into an edge area and a non-edge area using the lightness information; a detail enhancement unit to enhance detail of the edge area of the foreground area; and a blurring performing unit to perform blurring of the non-edge area and the background area.

In this instance, the foreground/background separation unit includes: an image generation unit to generate an image for emphasizing a high frequency component and an image for eliminating the high frequency component, for the input image using the lightness information of the input image; a local activity calculation unit to calculate a local activity for each of the image of emphasizing the high frequency component and the image for eliminating the high frequency component using a maximum lightness difference value in a block; and a focusing value calculation unit to calculate a focusing value for the input image using the local activity.

In this instance, the blurring performing unit includes: a hue value difference calculation unit to calculate a difference between a hue value denoting a peak and a hue value of the background area using a hue histogram of the foreground area; and a blur strength control unit to control a blur strength using the hue value difference and a maximum lightness difference value in a block of the non-edge area.

According to another aspect of the present invention, there is provided a method of generating an immersion, the method including: separating an input image into a foreground area and a background area using lightness information of the input image; classifying the foreground area into an edge area and a non-edge area using the lightness information; enhancing detail of the edge area of the foreground area; and performing blurring of the non-edge area and the background area.

Aspects of the present invention provide an apparatus and method of generating an immersion which can separate an input image into a foreground area and a background area, adaptively enhance detail, and adaptively process a blur, thereby increasing a stereoscopic effect of the image.

Aspects of the present invention also provide an apparatus and method of generating an immersion which can separate an input image into a foreground area and a background area using a focusing value based on a local activity, thereby adaptively processing a foreground/background.

Aspects of the present invention also provide an apparatus and method of generating an immersion which can control a gain based on a maximum lightness difference value in a block of an edge area and enhance detail, thereby effectively increasing a stereoscopic effect.

Aspects of the present invention also provide an apparatus and method of generating an immersion which can adaptively perform filtering using color analysis of a foreground area and process blurring, thereby preventing image quality from degrading.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
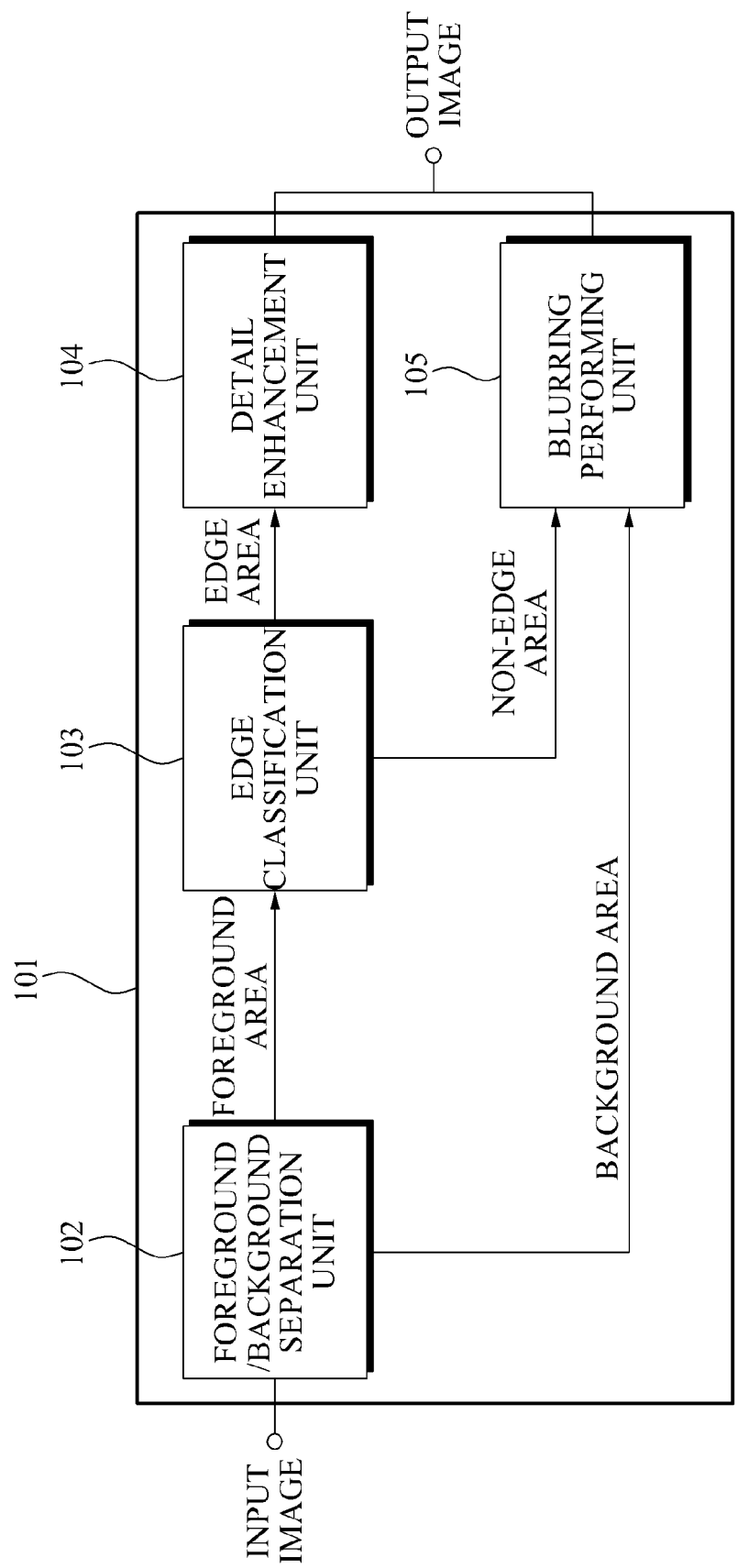
FIG. 1 is a block diagram illustrating a configuration of an apparatus for generating an immersion according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

A method of generating an immersion according to an embodiment of the present invention may be performed by an apparatus for generating an immersion.

FIG. 1 is a block diagram illustrating a configuration of an apparatus 101 for generating an immersion according to an embodiment of the present invention.

Referring to FIG. 1, the apparatus 101 for generating the immersion includes a foreground/background separation unit 102, an edge classification unit 103, a detail enhancement unit 104, and a blurring performing unit 105.

The foreground/background separation unit 102 may separate an input image into a foreground area and a background area using lightness information of the input image. The foreground/background separation unit 102 may calculate a focusing value using a local activity based on a maximum lightness difference value in a block. The foreground area has a high focusing value, and the background area has a low focusing value.

The foreground/background separation unit 102 may separate the input image into the foreground area and the background area using the calculated focusing value. The foreground/background separation unit 102 may separate the input image into the foreground area and the background area using a predetermined threshold of the focusing value. The foreground/background separation unit 102 is described in detail with reference to FIG. 2.

The edge classification unit 103 classifies the foreground area into an edge area and a non-edge area using the lightness information of the input image. Specifically, the edge classification unit 103 may use the maximum lightness difference value in the block used for calculating the focusing value by the foreground/background separation unit 102. For example, the edge classification unit 103 may classify, as the edge area, the foreground area in which the maximum lightness difference value in the block is greater than or equal to the predetermined threshold. Conversely, the edge classification unit 103 may classify, as the non-edge area, the foreground area in which the maximum lightness difference value in the block is less than the predetermined threshold.

The detail enhancement unit 104 may enhance detail of the edge area of the foreground area. Specifically, the detail enhancement unit 104 enhances a high frequency component of the edge area by controlling a gain based on a maximum lightness difference value in a block of the edge area. For example, the detail enhancement unit 104 enhances the high frequency component of the edge area using an unsharp masking scheme. Specifically, the unsharp masking scheme is a scheme of enhancing the high frequency component in the input image and adding the existing input image to the input image in which the high frequency component is enhanced. The unsharp masking scheme is described in detail with reference to FIG. 5.

The blurring performing unit 105 may perform blurring of the non-edge area and the background area. For example, the blurring performing unit 105 may adaptively perform the blurring of the non-edge area and the background area using bilateral filtering. The bilateral filtering disclosed in the present invention is an example, and the blurring performing unit 105 may perform the blurring using various methods. Specifically, the blurring performing unit 105 may reduce a signal level difference of the edge area and may preserve an edge of the input image using a domain Gaussian function and a range Gaussian function.

When the input image is separated into the foreground area and the background area using the above-described foreground/background separation unit 102, it is impossible to separate the input image into the foreground area and the background area accurately corresponding to foreground/background information recognized by a human. Specifically, since an area being actually needed to be separated as the foreground area has the low focusing value, the area may be separated as the background area. In this case, when the foreground area having the low focusing value is separated as the background area by the foreground/background separation unit 102, and the blurring of the foreground area having the low focusing value is performed by the blurring performing unit 105, image quality may degrade.

Accordingly, the blurring performing unit 105 may control a blur strength using information of the foreground area. Specifically, the blurring performing unit 105 may control the blur strength using a hue histogram of the foreground area. The controlled blur strength may be used for calculating a parameter of the range Gaussian function. Detailed contents of the blurring performing unit 105 are described with reference to FIG. 7 and FIG. 8.

Therefore, the apparatus 101 for generating the immersion according to the present embodiment of the present invention may separate the input image into the foreground area and the background area, respectively enhance detail, and perform the blurring, thereby increasing a difference between the foreground area and the background area. Since classification of the foreground area and the background area is distinct based on the difference, the immersion may be generated.

Figure 2:
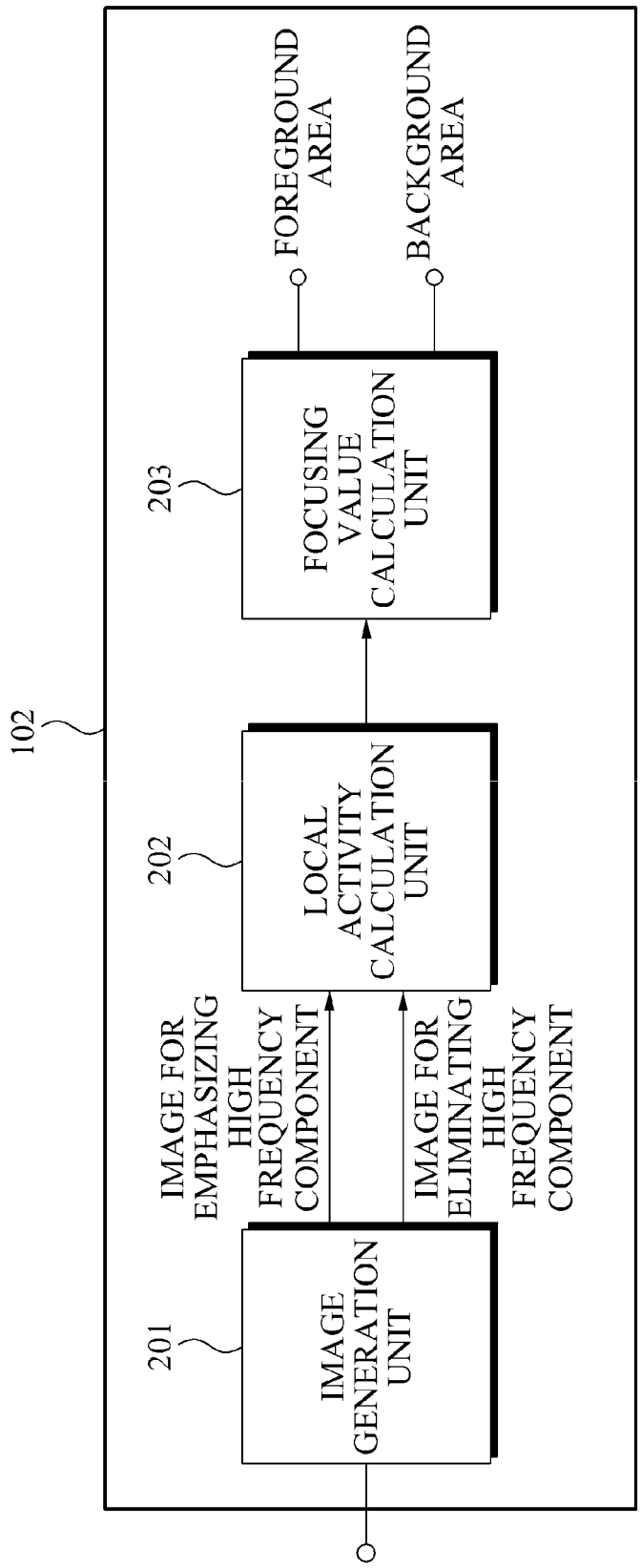
FIG. 2 is a block diagram illustrating a configuration of a foreground/background separation unit of FIG. 1.

FIG. 2 is a block diagram illustrating a configuration of the foreground/background separation unit 102 of FIG. 2.

Referring to FIG. 2, the foreground/background separation unit 102 includes an image generation unit 201, a local activity calculation unit 202, and a focusing value calculation unit 203.

The image generation unit 201 may generate an image for emphasizing a high frequency component and an image for eliminating the high frequency component, for the input image using the lightness information of the input image.

For example, the image generation unit 201 may generate the image for emphasizing the high frequency component and the image for eliminating the high frequency component, for the input image after converting a Red Green Blue (RGB) input image into a color space having the lightness information.

The local activity calculation unit 202 may calculate a local activity for each of the image of emphasizing the high frequency component and the image for eliminating the high frequency component using a maximum lightness difference value in a block. The maximum lightness difference value in the block denotes a maximum lightness difference value between a pixel existing in a center of a predetermined size mask and a peripheral pixel using the mask for the input image.

The local activity calculation unit 202 may calculate the local activity using an average value of maximum lightness difference values in each block using a plurality of blocks existing in the predetermined mask. A specific process of calculating the local activity is described with reference to FIG. 3.

The focusing value calculation unit 203 may calculate a focusing value for the input image using a difference of the local activity. Specifically, the focusing value denotes a focusing degree of a specific area of the input image. Generally, a foreground area may have a high focusing value, and a background area may have a low focusing value.

Accordingly, the foreground/background separation unit 102 separates the input image into the foreground area and the background area by comparing the calculated focusing value and a predetermined threshold of the focusing value. The foreground/background separation unit 102 is described in detail with reference to FIG. 4.

Figure 3:
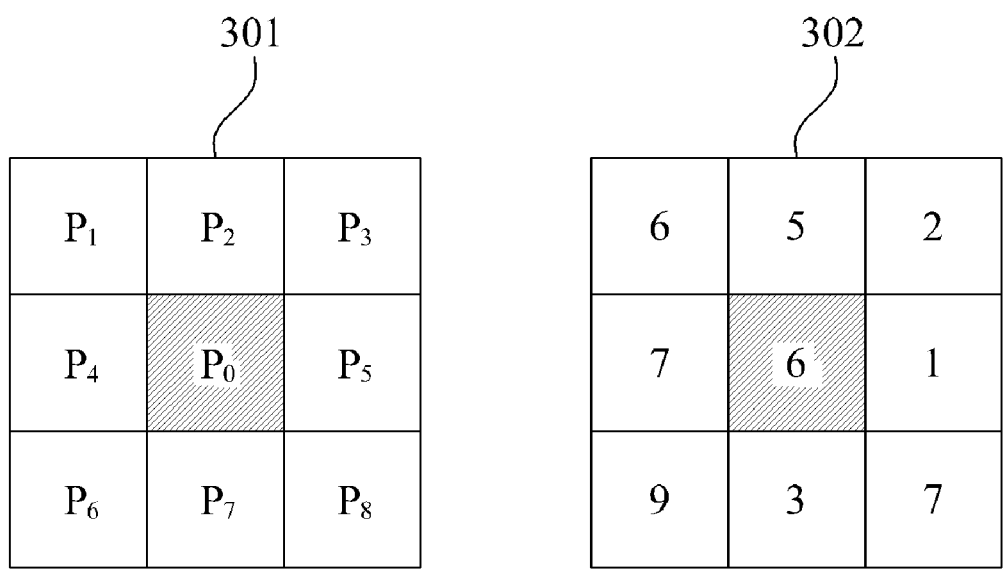
FIG. 3 illustrates an example of calculating a local activity using lightness information among blocks of an input image according to an embodiment of the present invention.

FIG. 3 illustrates an example of calculating a local activity using lightness information among blocks of an input image according to an embodiment of the present invention.

A block set 301 denotes blocks in which masking is performed in the input image divided into a plurality of 5*5 blocks using a 3*3 mask. A maximum lightness difference value in a block may denote a maximum value of lightness differences among block P0 located in a center of the 3*3 mask and peripheral blocks P1, P2, P3, P4, P5, P6, P7, and P8.

The local activity denotes an average value of maximum lightness difference values acquired by a 3*3 mask unit in a 5*5 block. The maximum value of lightness difference values in the 3*3 mask is referred to as a Local Maximum Difference (LMD). The local activity may be calculated using Equation 1:

$$LMD_{3\times 3} = \text{MAX}(|P0-P1|, |P0-P2|, |P0-P3|, |P0-P4|,$$
$$|P0-P5|, |P0-P6|, |P0-P7|, |P0-P8|)$$
$$LAM = \frac{1}{\text{Num\_Blocks}_{5\times 5}} \sum LMD_{3\times 3}(i),$$

[Equation 1]

where an LMD denotes a maximum value of lightness difference values in a 3*3 mask, and an LAM denotes a Local Activity Measure. A mask size used when determining the LAM is 5*5. However, the mask size used when determining the LMD and the LAM is not limited, and may be changed depending on a configuration of a system. For example, in FIG. 3, a lightness value of the block included in the 3*3 mask may be normalized as a block set 302. Accordingly, when applying the above-described Equation 1, in FIG. 3, the LMD is

MAX(|P0-P1|,|P0-P2|,|P0-P3|,|P0-P4|,|P0-P5|, |P0-P6|,|P0-P7|,|P0-P8|)=5.

Figure 4:
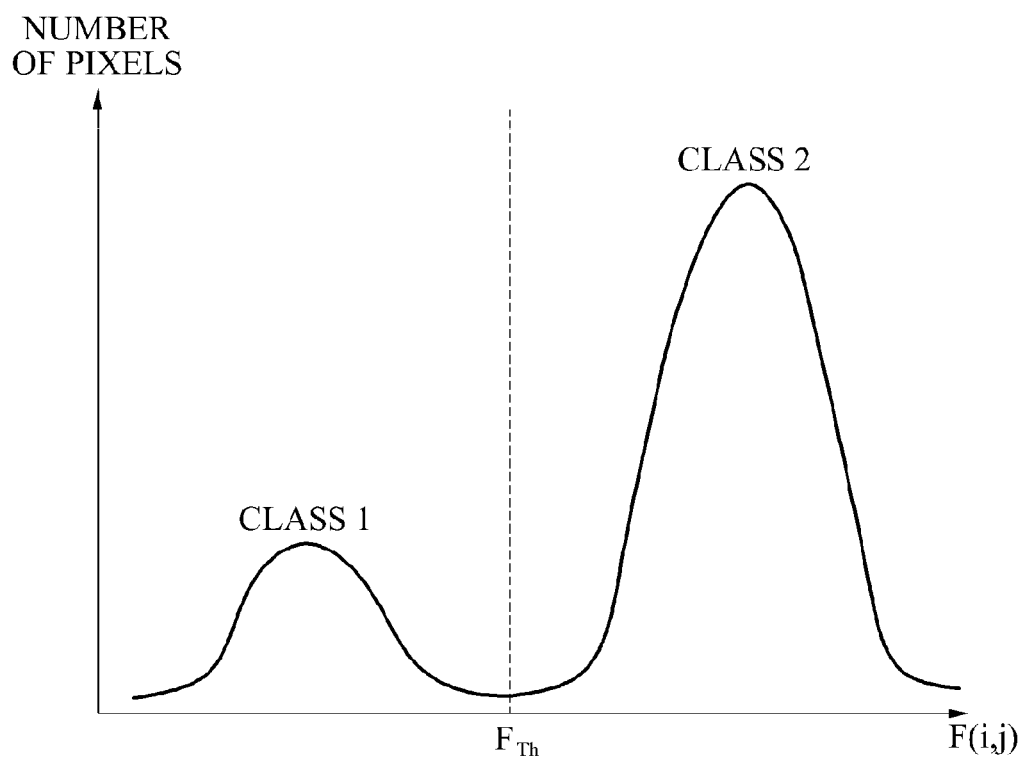
FIG. 4 illustrates an example of setting a threshold of separating an input image into a foreground area and a background area according to an embodiment of the present invention.

FIG. 4 illustrates an example of setting a threshold of separating an input image into a foreground area and a background area according to an embodiment of the present invention.

In FIG. 4, F denotes a focusing value. The focusing value calculation unit 203 may calculate a focusing value for the input image using the local activity. Specifically, the focusing value calculation unit 203 may calculate the focusing value using a difference between a local activity of an image for emphasizing a high frequency component and a local activity of an image for eliminating the high frequency component.

For example, the focusing value calculation unit 203 may calculate the focusing value of the input image using Equation 2:

$$F(i,j) = |LAM_{DE}(i,j) - LAM_{Blur}(i,j)| \ 0 \leq F(i,j) \leq 255,$$ [Equation 2]

where F(i,j) denotes a focusing value of an area located in (i,j), $LAM_{DE}(i,j)$ denotes a local activity of an image for emphasizing a high frequency component, and $LAM_{Blur}(i,j)$ denotes a local activity of an image for eliminating the high frequency component.

In FIG. 4, $F_{Th}$ denotes a predetermined threshold of the focusing value. For example, $F_{Th}$ may be set to maximize a variance value of each of the foreground area and the background area by a histogram using the focusing value. The threshold of the focusing value, $F_{Th}$, may be calculated using Equation 3:

$$t = \text{Max}_{0 \leq t < L}\{w_1(t) \times [\mu_1(t) - \mu_T]^2 + w_2(t) \times [\mu_2(t) - \mu_T]^2\}$$ [Equation 3]

$$\mu_T = \sum_{i=0}^{L-1} i \times p_i = \sum_{i=0}^{L-1} i \times \frac{n_i}{n}$$

$$u_1(t) = \sum_{i=0}^{t} i \times p_i / w_1(t),$$

$$u_2(t) = \sum_{i=t+1}^{L-1} i \times p_i / w_2(t)$$

$$w_1(t) = \sum_{i=0}^{t} p_i,$$

$$w_2(t) = \sum_{i=t+1}^{L-1} p_i,$$

where $[\mu_1(t)-\mu_T]^2$ and $[\mu_2(t)-\mu_T]^2$ denote variances of class 1 and class 2, and $w_1$ and $w_2$ denote probability values of pixels included in class 1 and class 2. Also, the threshold of the focusing value may be determined to minimize the variance in each class area, and to maximize the variance between two classes. Specifically, $F_{Th}$ may be set to maximize a variance of an area having the focusing value greater than or equal to $F_{Th}$ in the histogram using the focusing value, that is, the foreground area, and an area having the focusing value less than $F_{Th}$, that is, the background area.

The foreground/background separation unit 102 separates the area having the focusing value greater than or equal to $F_{Th}$ in the input image (class 2) as the foreground area, and separates the area having the focusing value less than $F_{Th}$ (class 1) as the background area. Referring to FIG. 4, it may be known that the variance of each of class 1 (the background area) and class 2 (the foreground area) is maximum using the predetermined value $F_{Th}$.

Figure 5:
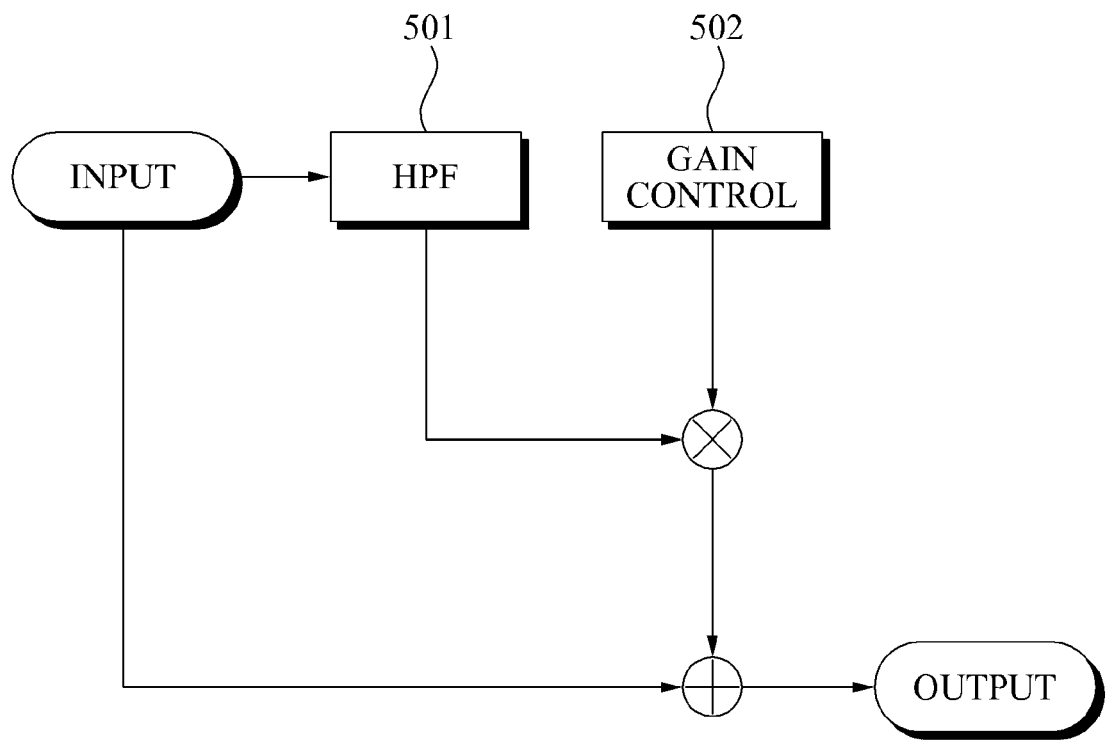
FIG. 5 illustrates an example of enhancing detail of an edge area of a foreground area using gain control according to an embodiment of the present invention.

FIG. 5 illustrates an example of enhancing detail of an edge area of a foreground area using gain control according to an embodiment of the present invention.

For example, the detail enhancement unit 104 may enhance the detail of the edge area of the foreground area using an unsharp masking scheme. FIG. 5 illustrates a process of enhancing the detail of the edge area of the foreground area using the unsharp masking scheme.

The detail enhancement unit 104 may apply a High Pass Filter (HPF) 501 to each channel of the edge area. The detail enhancement unit 104 may multiply a gain value of controlling a gain (502) by a channel value to which a value of the HPF 501 is applied. The detail enhancement unit 104 may add the multiplication result to each original channel value of the input image, thereby enhancing a high frequency component of the edge area. For example, the detail enhancement unit 104 may enhance the high frequency component of the edge area in accordance with Equation 4:

$$R_{out} = R_{in} + \text{Gain} \times R_{HPF}$$

$$G_{out} = G_{in} + \text{Gain} \times G_{HPF},$$

$$B_{out} = B_{in} + \text{Gain} \times B_{HPF}$$ [Equation 4]

where $R_{in}$, $G_{in}$, and $B_{in}$ denote channel values of an input image, $R_{HPF}$, $G_{HPF}$, and $B_{HPF}$ denote values of applying an HPF to each channel value of the input image, and $R_{out}$, $G_{out}$, and $B_{out}$ denote each channel value of an edge area in which a high frequency component is enhanced. Also, Gain denotes a gain controlled by the detail enhancement unit 104. Gain control is described in detail with reference to FIG. 6.

Figure 6:
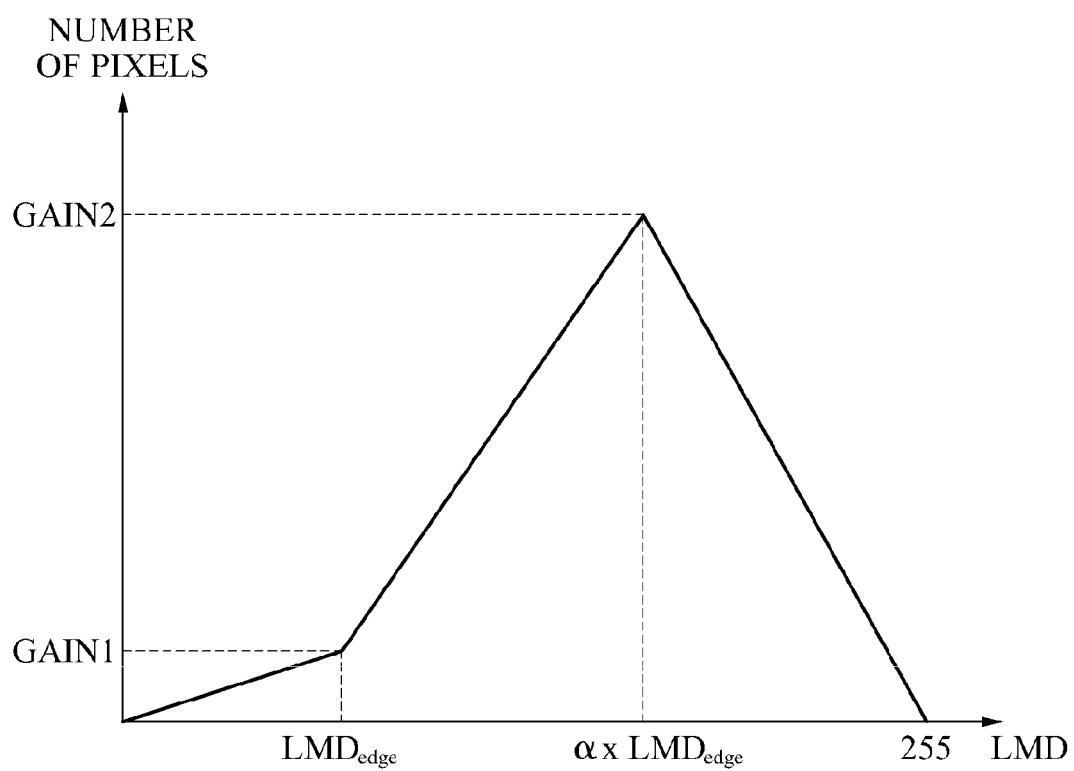
FIG. 6 illustrates an example that a detail enhancement unit controls a gain using a maximum lightness difference value in a block according to an embodiment of the present invention.

FIG. 6 illustrates an example that a detail enhancement unit controls a gain using an LMD according to an embodiment of the present invention.

Referring to FIG. 6, the gain is controlled based on an LMD value. For example, FIG. 6 may be shown using Equation 5:

case1: $LMD_{in} < LMD_{edge}$ [Equation 5]

$$\text{Gain} = \frac{Gain_1}{LMD_{edge}} \times LMD_{in}$$

case2: $LMD_{edge} \leq LMD_{in} \leq \alpha \times LMD_{edge}$ $$\text{Gain} = \frac{Gain_2 - Gain_1}{\alpha \times LMD_{edge} - LMD_{edge}} \times (LMD_{in} - LMD_{edge}) + Gain_2'$$

case3: $\alpha \times LMD_{edge} < LMD_{in}$ $$\text{Gain} = \frac{-Gain_2}{255 - \alpha \times LMD_{edge}} \times (LMD_{in} - \alpha \times LMD_{edge})$$

where an LMD denotes a maximum lightness difference value in a 3*3 block used for calculating a focusing value. $LMD_{edge}$ denotes a predetermined threshold of the LMD for an edge area. Also, a denotes a predetermined constant, and is changed depending on a system. $Gain_1$ and $Gain_2$ may be changed depending on the system. $LMD_{in}$ denotes an LMD of a pixel classified as an edge area to enhance detail. Specifically, the detail enhancement unit 104 may enhance the detail of the edge area by applying the gain adaptively controlled based on the LMD value.

Figure 7:
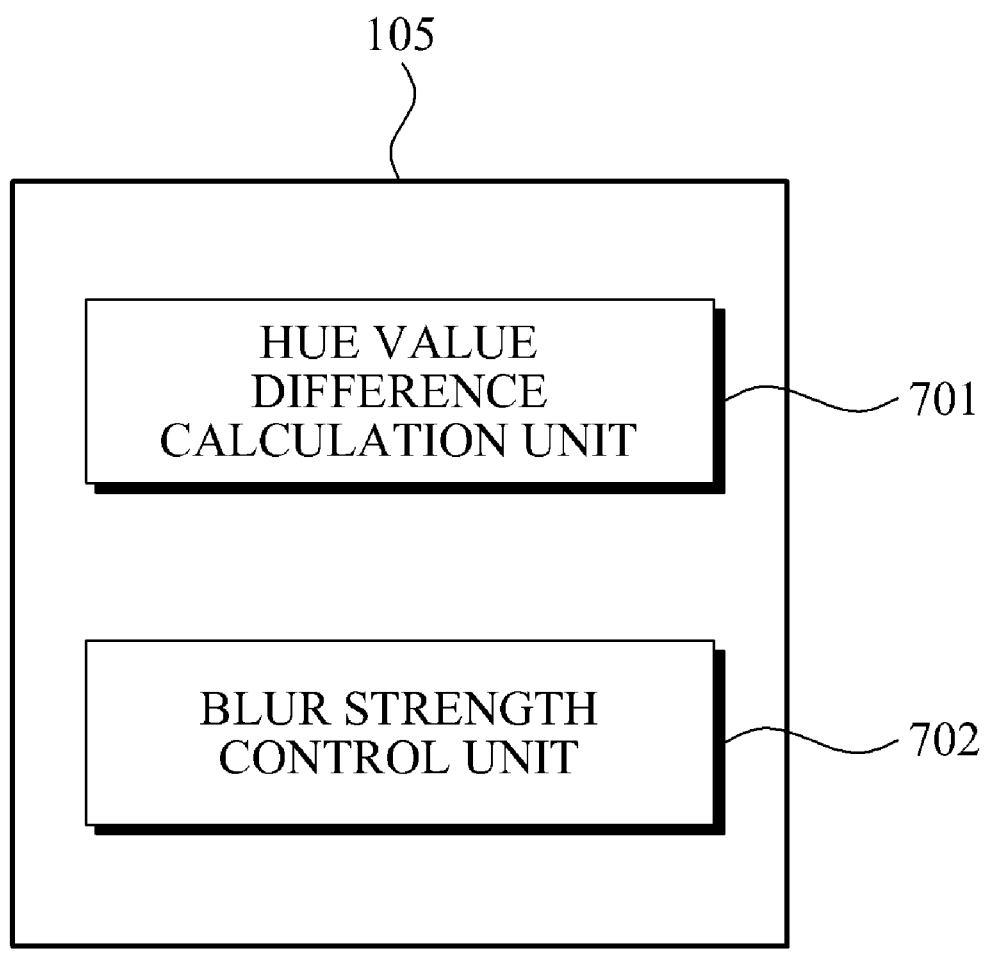
FIG. 7 is a block diagram illustrating a configuration of a blurring performing unit of FIG. 1.

FIG. 7 is a block diagram illustrating a configuration of the blurring performing unit 105 of FIG. 1.

Referring to FIG. 7, the blurring performing unit 105 includes a hue value difference calculation unit 701 and a blur strength control unit 702.

The hue value difference calculation unit 701 may calculate a difference between a hue value denoting a peak and a hue value of the background area using a hue histogram of the foreground area. As described above, since an area actually needing to be classified as the foreground area has a low focusing value and is separated as the background area, error in foreground/background separation may occur. When blurring of the background area separated by the error is performed by the blurring performing unit 105, image quality may degrade.

Therefore, the present invention may adaptively control a blurring degree using information of the foreground area. In this instance, the information of the foreground area may be the hue value denoting the peak in the hue histogram of the foreground area. Specifically, the blurring performing unit 105 may calculate the difference between the hue value denoting the peak in the foreground area and the hue value of the pixel classified as the background area using the hue value difference calculation unit 701, and control a blur strength based on the difference.

The blur strength control unit 702 may control the blur strength using the hue value difference and an LMD value of the non-edge area. In this instance, as the hue value difference increases, the blur strength control unit 702 may increase the blur strength.

For example, the blurring performing unit 105 may perform the blurring by applying bilateral filtering to the background area and a non-edge area of the foreground area. Specifically, the blurring performing unit 105 may apply filtering via two operations using a domain Gaussian function and a range Gaussian function. The blurring performing unit 105 may perform the blurring by adaptively reducing a signal level difference of each edge area and preserving the edge area using the bilateral filtering.

The blurring performing unit 105 may perform the bilateral filtering in accordance with Equation 6:

$$\tilde{I}(x, y) = \frac{\sum_{p \in N(x,y)} W_d(\|p(x,y) - (x,y)\|) \times \tilde{W}_r(|I(x,y) - I(p(x,y))|) \times I(p(x,y))}{\sum_{p \in N(x,y)} W_d(\|p(x,y) - (x,y)\|) \times W_r(|I(x,y) - I(p(x,y))|)}$$ [Equation 6]

$$W_d(s) = e^{-s^2/2\sigma_d^2}$$

$$W_r(s) = e^{-s^2/2\sigma_s^2},$$

where $W_d(s)$ is a domain Gaussian function and denotes a weight of setting, as a standard, a spatial distance between a center processing pixel and an adjacent pixel. Also, $W_r(s)$ is a range Gaussian function and denotes a weight of setting, as a standard, a lightness value difference between the center processing pixel and the adjacent pixel. Specifically, as the lightness value difference from the center processing pixel decreases and a spatial distance difference from the center pixel decreases, the weight may have a high value.

In this instance, a denominator of Equation 6 may be a normalization term for normalizing the weight. Also, the domain Gaussian function may use a fixed domain sigma $\sigma_d$, and the range Gaussian function may use a range sigma $\sigma_s$ controlled based on the hue value difference and a lightness difference between blocks of the non-edge area. Specifically, the blur strength controlled by the blur strength control unit 702 denotes the range sigma.

Figure 8:
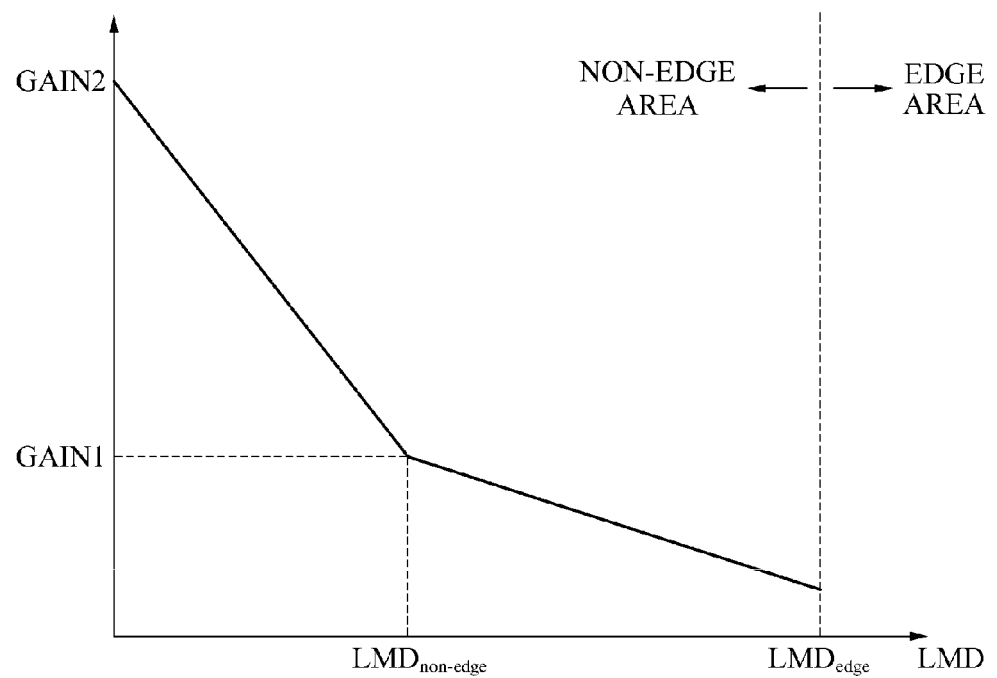
FIG. 8 illustrates that a blur strength control unit of an apparatus for generating an immersion adaptively performs blurring based on a maximum lightness difference value in a block according to an embodiment of the present invention.

FIG. 8 illustrates that a blur strength control unit of an apparatus for generating an immersion adaptively performs blurring based on a maximum lightness difference value in a block according to an embodiment of the present invention.

The blur strength control unit 702 may adaptively control a blur strength based on an LMD for a non-edge area of a foreground area. In FIG. 8, the blur strength may be determined by Equation 7:

case 1 : Edge Pixel Gain = 0.2 [Equation 7]

case 2 : Non-Edge Pixel $$\begin{cases} \text{if} \left( \begin{array}{l} LMD_{non\_edge} \leq LMD_{in} \leq LMD_{edge} \ \&\& \\ \text{Huf\_diff} \geq Th \ \&\& \ \text{FB\_Info} == \text{Back} \end{array} \right) \\ \text{Gain} = \dfrac{1 - Gain_1}{LMD_{edge} - LMD_{non\_edge}} \times (LMD_{in} - LMD_{non\_edge}) + Gain_1 \\ \text{else if} \left( \begin{array}{l} LMD_{in} < LMD_{non\_edge} \ \&\& \ \text{Hue\_diff} \geq \\ Th \ \&\& \ \text{FB\_Info} == \text{Back} \end{array} \right) \\ \text{Gain} = \dfrac{Gain_1 - Gain_2}{LMD_{non\_edge}} \times LMD_{in} + Gain_2 \\ \text{else Gain} = 0.5 \ (\text{Background}) \end{cases}$$

where a gain value denotes a blur strength. The blurring performing unit 105 may determine a range sigma value using the blur strength determined by the above-described Equation 7. Accordingly, the blurring performing unit 105 may perform bilateral filtering that adaptively reduces a signal level difference of the edge area and preserves the edge area using the determined range sigma value and the fixed domain sigma value.

Figure 9:
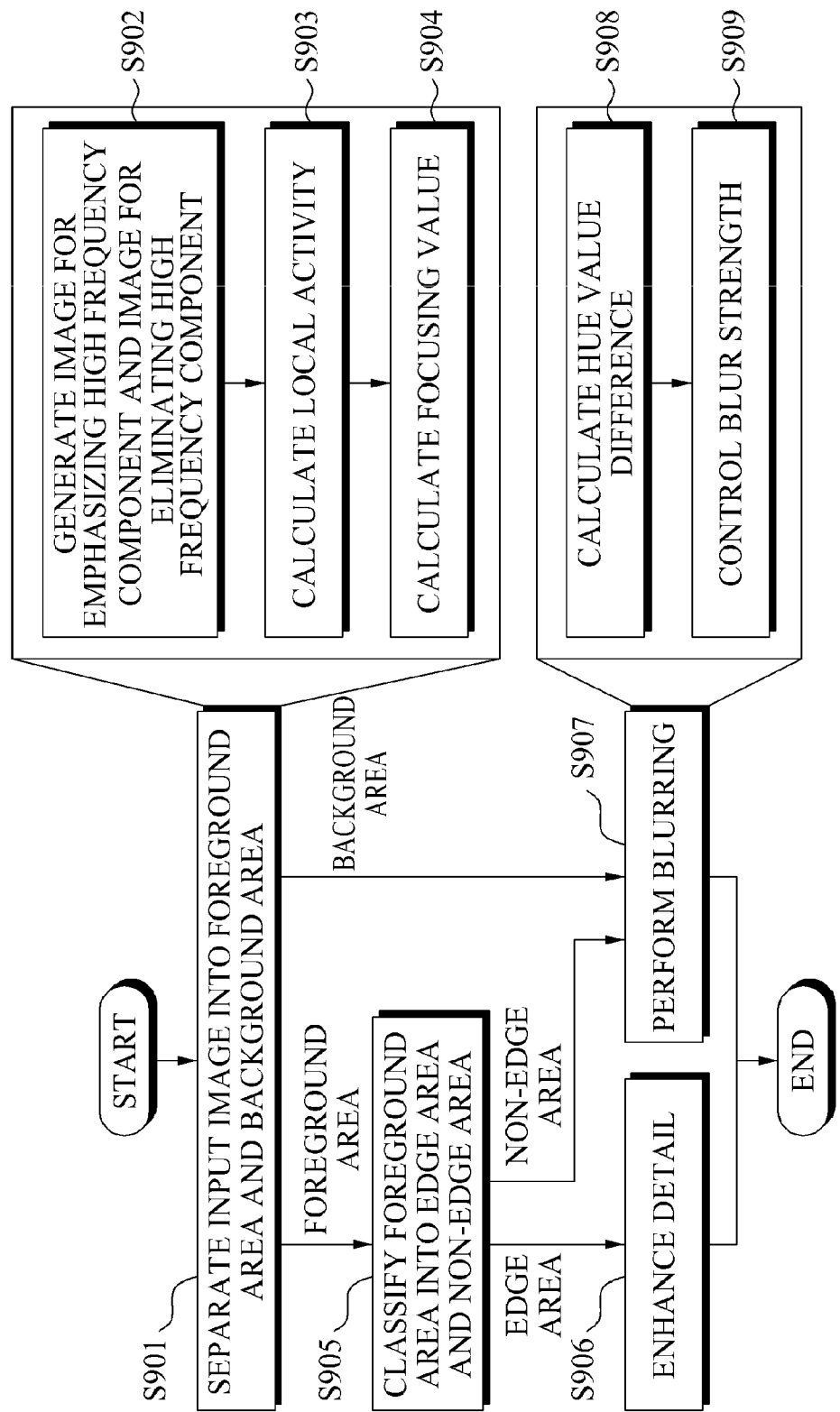
FIG. 9 is a flowchart illustrating a method of generating an immersion according to an embodiment of the present invention.

FIG. 9 is a flowchart illustrating a method of generating an immersion according to an embodiment of the present invention.

In operation S901, the method of generating the immersion according to the present embodiment of the present invention separates an input image into a foreground area and a background area using lightness information of the input image.

The separating in operation S901 includes generating an image for emphasizing a high frequency component and an image for eliminating the high frequency component, for the input image using the lightness information of the input image in operation S902.

Also, the separating in operation S901 includes calculating a local activity of each of the image for emphasizing the high frequency component and the image for eliminating the high frequency component using a maximum lightness difference value in a block in operation S903.

Also, the separating in operation S901 includes calculating a focusing value for the input image using a difference of the local activity in operation S904.

In this instance, the separating in operation S901 separates the input image into the foreground area and the background area by comparing the calculated focusing value and a predetermined threshold of the focusing value. Here, the predetermined threshold of the focusing value is set to maximize a variance between the foreground area and the background area.

Also, the separating in operation S901 separates an area denoting the focusing value greater than or equal to the threshold as the foreground area of the input image, and separates an area denoting the focusing value less than the threshold as the background area of the input image.

In operation S905, the method of generating the immersion according to the present embodiment of the present invention classifies the foreground area into an edge area and a non-edge area using the lightness information.

The classifying in operation S905 classifies the foreground area into the edge area and the non-edge area using a maximum lightness difference value in a block.

In operation S906, the method of generating the immersion according to the present embodiment of the present invention enhances detail of the edge area of the foreground area.

The enhancing in operation S906 enhances a high frequency component of the edge area by controlling a gain based on a maximum lightness difference value in a block of the edge area.

In operation S907, the method of generating the immersion according to the present embodiment of the present invention performs blurring of the non-edge area and the background area.

The performing in operation S907 includes calculating a difference between a hue value denoting a peak and a hue value of the background area using a hue histogram of the foreground area in operation S908.

The performing in operation S907 includes controlling a blur strength using the hue value difference and a maximum lightness difference value in a block of the non-edge area in operation S909.

The performing in operation S907 performs bilateral filtering that adaptively eliminates a signal level difference of the edge area and preserves the edge area using the controlled blur strength.

The controlling in operation S909 may increase the blur strength as the hue value difference increases.

Portions not described with reference to FIG. 9 have been described with reference to FIGS. 1 through 9.

The method of generating the immersion according to aspects of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described aspects of the present invention.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. An apparatus for generating an immersion, the apparatus comprising:
    a foreground/background separation unit to separate an input image into a foreground area and a background area using lightness information of the input image;
    an edge classification unit to classify the foreground area into an edge area and a non-edge area using the lightness information;
    a detail enhancement unit to enhance detail of the edge area of the foreground area; and
    a blurring performing unit to perform blurring of the non-edge area and the background area.

2. The apparatus of claim 1, wherein the foreground/background separation unit comprises:
  an image generation unit to generate an image for emphasizing a high frequency component and an image for eliminating the high frequency component, for the input image using the lightness information of the input image;
  a local activity calculation unit to calculate a local activity for each of the image of emphasizing the high frequency component and the image for eliminating the high frequency component using a maximum lightness difference value in a block; and
  a focusing value calculation unit to calculate a focusing value for the input image using the local activity.

3. The apparatus of claim 2, wherein the foreground/background separation unit separates the input image into the foreground area and the background area by comparing the calculated focusing value and a predetermined threshold of the focusing value.

4. The apparatus of claim 3, wherein the predetermined threshold of the focusing value is set to maximize a variance between the foreground area and the background area.

5. The apparatus of claim 3, wherein the foreground/background separation unit separates an area denoting the focusing value greater than or equal to the threshold as the foreground area, and separates an area denoting the focusing value less than the threshold as the background area.

6. The apparatus of claim 1, wherein the edge classification unit classifies the foreground area into the edge area and the non-edge area using a maximum lightness difference value in a block.

7. The apparatus of claim 1, wherein the detail enhancement unit enhances a high frequency component of the edge area by adaptively controlling a gain based on a maximum lightness difference value in a block of the edge area.

8. The apparatus of claim 1, wherein the detail enhancement unit enhances a high frequency component of the edge area using an unsharp masking scheme.

9. The apparatus of claim 1, wherein the blurring performing unit comprises:
  a hue value difference calculation unit to calculate a difference between a hue value denoting a peak and a hue value of the background area using a hue histogram of the foreground area; and
  a blur strength control unit to control a blur strength using the hue value difference and a maximum lightness difference value in a block of the non-edge area.

10. The apparatus of claim 9, wherein the blur strength control unit increases the blur strength as the hue value difference increases.

11. The apparatus of claim 9, wherein the blurring performing unit performs bilateral filtering that adaptively eliminates a signal level difference of the edge area and preserves the edge area using the controlled blur strength.

12. A method of generating an immersion, the method comprising:
  separating an input image into a foreground area and a background area using lightness information of the input image;
  classifying the foreground area into an edge area and a non-edge area using the lightness information;
  enhancing detail of the edge area of the foreground area; and
  performing blurring of the non-edge area and the background area.

13. The method of claim 12, wherein the separating comprises:
  generating an image for emphasizing a high frequency component and an image for eliminating the high frequency component, for the input image using the lightness information of the input image;
  calculating a local activity of each of the image for emphasizing the high frequency component and the image for eliminating the high frequency component using a maximum lightness difference value in a block; and
  calculating a focusing value for the input image using the local activity.

14. The method of claim 13, wherein the separating separates the input image into the foreground area and the background area by comparing the calculated focusing value and a predetermined threshold of the focusing value.

15. The method of claim 14, wherein the predetermined threshold of the focusing value is set to maximize a variance between the foreground area and the background area.

16. The method of claim 14, wherein the separating separates an area denoting the focusing value greater than or equal to the threshold as the foreground area, and
  separates an area denoting the focusing value less than the threshold as the background area.

17. The method of claim 12, wherein the classifying classifies the foreground area into the edge area and the non-edge area using a maximum lightness difference value in a block.

18. The method of claim 12, wherein the enhancing enhances a high frequency component of the edge area by adaptively controlling a gain based on a maximum lightness difference value in a block of the edge area.

19. The method of claim 12, wherein the enhancing enhances a high frequency component of the edge area using an unsharp masking scheme.

20. The method of claim 12, wherein the performing comprises:
  calculating a difference between a hue value denoting a peak and a hue value of the background area using a hue histogram of the foreground area; and
  controlling a blur strength using the hue value difference and a maximum lightness difference value in a block of the non-edge area.

21. The method of claim 20, wherein the controlling increases the blur strength as the hue value difference increases.

22. The method of claim 20, wherein the performing performs bilateral filtering that adaptively eliminates a signal level difference of the edge area and preserves the edge area using the controlled blur strength.

23. A non-transitory computer-readable recording medium storing a program for implementing a method of generating an immersion, the method comprising:
  separating an input image into a foreground area and a background area using lightness information of the input image;
  classifying the foreground area into an edge area and a non-edge area using the lightness information;
  enhancing detail of the edge area of the foreground area; and
  performing blurring of the non-edge area and the background area.

* * * * *